(12) United States Patent
Kawamura et al.

(10) Patent No.: US 8,331,301 B2
(45) Date of Patent: Dec. 11, 2012

(54) COMMUNICATION CONTROL METHOD, MOBILE STATION AND BASE STATION

(75) Inventors: Teruo Kawamura, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 234 days.

(21) Appl. No.: 12/673,240

(22) PCT Filed: Aug. 13, 2008

(86) PCT No.: PCT/JP2008/064548
§ 371 (c)(1),
(2), (4) Date: Jun. 8, 2010

(87) PCT Pub. No.: WO2009/022710
PCT Pub. Date: Feb. 19, 2009

(65) Prior Publication Data
US 2012/0033561 A1 Feb. 9, 2012

(30) Foreign Application Priority Data
Aug. 14, 2007 (JP) .................................. 2007-211600

(51) Int. Cl.
*H04W 4/00* (2009.01)
(52) U.S. Cl. ........................................ 370/329; 370/332
(58) Field of Classification Search .................. 370/329, 370/332, 431
See application file for complete search history.

(56) References Cited

U.S. PATENT DOCUMENTS

| | | | | |
|---|---|---|---|---|
| 7,813,322 | B2* | 10/2010 | Laroia et al. | 370/333 |
| 2005/0202818 | A1* | 9/2005 | Hondo et al. | 455/434 |
| 2007/0047576 | A1* | 3/2007 | Cheng et al. | 370/466 |
| 2008/0304445 | A1* | 12/2008 | Chou | 370/329 |

FOREIGN PATENT DOCUMENTS

| | | |
|---|---|---|
| JP | 2007-151059 A | 6/2007 |
| JP | 2008-236018 A | 10/2008 |
| WO | 2008/114694 A1 | 9/2008 |
| WO | 2008/114724 A1 | 9/2008 |

OTHER PUBLICATIONS

Panasonic, "Variable Phase Definition of the Reference Signal for CQI in PUCCH," 3GPP TSG RAN WG1 Meeting #50, R1-073621, Athens, Greece; Aug. 20-24, 2007, 5 pages.
NTT DoCoMo, et al., "CDMA-Based Control Signaling Multiplexing in E-UTRA Uplink," 3GPP TSG RAN WG1 Meeting #49, R1-072438, Kobe, Japan; May 7-11, 2007, 3 pages.
NTT DoCoMo, et al., "Implicit Resource Allocation of ACK/NACK Signal in E-UTRA Uplink," 3GPP TSG RAN WG1 Meeting #49, R1-072439, Kobe, Japan; May 7-11, 2007, 3 pages.

(Continued)

*Primary Examiner* — Phuc Tran
(74) *Attorney, Agent, or Firm* — Osha Liang LLP (57) ABSTRACT

The disclosed mobile station includes: a CAZAC code generation unit configured to generate CAZAC code according to a CAZAC sequence number reported from the base station; a cyclic shift unit configured to cyclically shift each symbol of the CAZAC code based on a cyclic shift number reported from the base station, and a block spreading unit that operates with the cyclic shift unit or operates instead of the cyclic shift unit, and that performs block spreading processing for the CAZAC code according to a block spreading number reported from the base station.

18 Claims, 6 Drawing Sheets

OTHER PUBLICATIONS

NTT DoCoMo, et al., "Optimum RS Structure for Uplink L1/L2 Control Channel in E-UTRA," 3GPP TSG RAN WG1 Meeting #49bis, R1-072952, Orlando, USA; Jun. 25-29, 2007, 7 pages.

Patent Abstracts of Japan, Publication No. 2008-236018, dated Oct. 2, 2008, 1 page.

Patent Abstracts of Japan, Publication No. 2007-151059, dated Jun. 14, 2007, 1 page.

3GPP TS 25.212 V7.5.0, May 2007, "Multiplexing and channel coding (FDD)," 103 pages.

David C. Chu, IEEE Transactions on Information Theory, Jul. 1972, vol. 38, pp. 531-532, "Polyphase Codes With Good Periodic Correlation Properties," 2 pages.

3GPP TSG RAN WG1 Ad Hoc on LTE, R1-050822, London, UK, Aug. 29-Sep. 2, 2005, "On Allocation of Uplink Pilot Sub-Channels in EUTRA SC-FDMA," 7 pages.

International Search Report issued in PCT/JP2008/064548, mailed on Nov. 18, 2008, with translation, 9 pages.

Written Opinion issued in PCT/JP2008/064548, mailed on Nov. 18, 2008, 3 pages.

\* cited by examiner

COMMUNICATION CONTROL METHOD, MOBILE STATION AND BASE STATION

TECHNICAL FIELD

The present invention relates a communication control method. More particularly, the present invention relates to a communication control method for determining whether feedback information from a mobile station includes reception state information and acknowledgement information, and relates to a base station and a mobile station that can use the communication control method.

BACKGROUND ART

In E-UTRA (Evolved-UMTS (Universal Mobile Telecommunications System) Terrestrial Radio Access), single-carrier (SC)-FDMA (Frequency Division Multiplexing Access) is adopted as an uplink radio access scheme.

Figure 1:
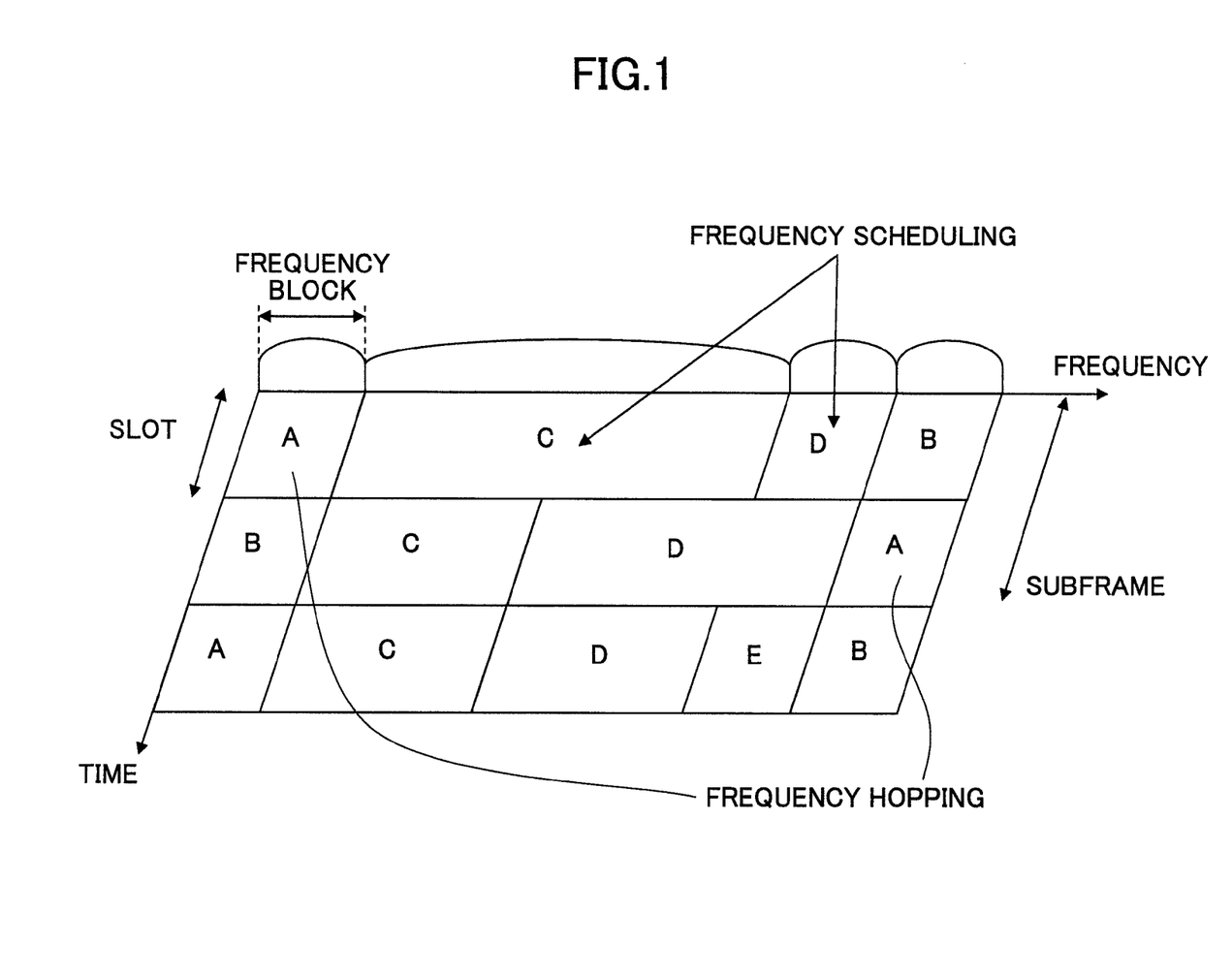
FIG. 1 is a diagram for explaining radio resource assignment in the single-carrier transmission scheme.

In this scheme, as shown in FIG. 1, users A, B, C, D and E in a cell perform transmission by using different time and frequency resources (the minimum unit is called a resource block), so that orthogonality among users is realized in the cell, and single-carrier transmission with low PAPR (Peak-to-Average Power Ratio) can be realized by assigning consecutive frequencies. As a result, power consumption of the mobile station can be reduced. In addition, compared to a case where multicarrier transmission is used, there is an advantage that coverage area can be enlarged. Also, since the scheduler of the base station determines time or frequency resources to be assigned based on propagation state of each user and QoS (data rate, required error rate, delay, etc.) of data that should be sent, so that each user is assigned time/frequency resources of good propagation state. As a result, there is an advantage that throughput increases.

In this scheme, an uplink control channel is used for transmission of CQI (Channel Quality Indicator) for realizing frequency scheduling and adaptive modulation/channel coding for the downlink data channel, and used for transmission of acknowledgement information for retransmitting downlink data and the like. The acknowledgement information (that may be referred to as ACK/NACK information hereinafter) is obtained by error detection such as Cyclic Redundancy Check (CRC), and includes positive acknowledgement (ACK) that is for a case when an error is not detected, and negative acknowledgement (NACK) that is for a case when an error is detected.

As mentioned above, since the single-carrier based radio access scheme is adopted in the uplink, it is necessary to multiplex CQI and ACK/NACK information using the same resources when a user transmits CQI and ACK/NACK information in the same subframe. In addition, corresponding to that, in the base station, it is necessary to change methods of reception processing between a case in which only CQI is transmitted and a case in which CQI and ACK/NACK information are multiplexed and transmitted.

By the way, even though CQI and ACK/NACK information should be fed back, when the mobile station transmits only CQI due to reception error in the downlink control channel, not only the base station cannot obtain the ACK/NACK information, but also the base station performs reception processing by determining that information in which CQI and ACK/NACK information are multiplexed has been received. Thus, proper processing cannot be performed. Especially, from the viewpoint of preventing transmission delay of the whole communication system and preventing deterioration of downlink throughput due to the delay, it is important to quickly grasp ACK or NACK. Therefore, in order to detect what information the mobile station has sent, DTX (discontinuous transmission) detection of ACK/NACK information is performed.

By performing DTX detection of the ACK/NACK information, there are advantages that the base station can properly receive CQI and ACK/NACK information, and can perform demultiplexing processing, the base station can properly select RV parameter for retransmission of downlink data, and can perform transmission power control for the downlink control channel, and the like.

DISCLOSURE OF THE INVENTION

Problem to be Solved by the Invention

In conventional techniques, the above-mentioned DTX determination for the ACK/NACK information is performed by transmitting a bit indicating DTX. However, in this case, the bit indicating DTX should be always transmitted, which includes a problem in transmission efficiency. In addition, DTX determination based on received power may be performed. That is, when transmitting both of CQI and ACK/NACK information, the mobile station transmits uplink control channel information with higher transmission power compared to the case where only CQI is transmitted. Therefore, the base station can perform DTX determination by comparing the received power with a predetermined threshold value. However, according to such a method, there is a problem in that it is difficult to perform DTX determination for the ACK/NACK information accurately since the difference between the received power and the predetermined threshold value cannot be set so large.

An object of the present invention is to provide a method that can accurately determine presence or absence of acknowledgement information in the uplink of Evolved UTRA, and to provide a mobile station and a base station that can apply the method.

Means for Solving the Problem

For achieving the above-mentioned object, an embodiment of the present invention provides a communication control method for determining whether information transmitted from a mobile station in a single-carrier scheme includes reception state information and acknowledgement information. The communication control method includes:

a step in which the mobile station generates a first uplink control channel when transmitting reception state information, and the mobile station generates a second uplink control channel when transmitting reception state information and acknowledgement information;

a step in which the mobile station transmits one of the first uplink control channel and the second uplink control channel; a step in which the base station receives one of the first and the second uplink control channels, performs first correlation detection for the received uplink control channel to obtain a first correlation value, and performs second correlation detection for the received uplink control channel to obtain a second correlation value; and a step in which the base station compares the first correlation value and the second correlation value, and determines that the mobile station has transmitted the reception state information if the first correlation value is greater than the second correlation value, and the base station determines that the mobile station has transmitted the reception state information and the acknowledgement information if the second correlation value is greater than the first correlation value.

Another embodiment of the present invention provides a mobile station including: an uplink control channel generation unit configured to generate a first uplink control channel when transmitting reception state information, and to generate a second uplink control channel when transmitting reception state information and acknowledgement information.

Another embodiment of the present invention provides a base station used with the mobile station, including:

a determination unit configured to receive one of the first and the second uplink control channels from the mobile station, perform first correlation detection for the received uplink control channel to obtain a first correlation value, and perform second correlation detection for the received uplink control channel to obtain a second correlation value, and to compare the first correlation value and the second correlation value, and determine that the mobile station has transmitted the reception state information if the first correlation value is greater than the second correlation value, and determine that the mobile station has transmitted the reception state information and the acknowledgement information if the second correlation value is greater than the first correlation value.

Effect of the Present Invention

According to the present invention, a method that can accurately determine (presence or absence of acknowledgement information in the uplink of Evolved UTRA can be provided, and a mobile station and a base station that can apply the method can be provided.

DESCRIPTION OF REFERENCE SIGNS 20 mobile station
222 CAZAC code generation unit
224 cyclic shift unit
226 block spreading unit
30 base station
310 DTX determination unit for ACK/NACK information

PREFERRED EMBODIMENTS FOR CARRYING OUT THE INVENTION

In the following, embodiments of the present invention are described with reference to figures.

<Mobile Station>

Figure 2:
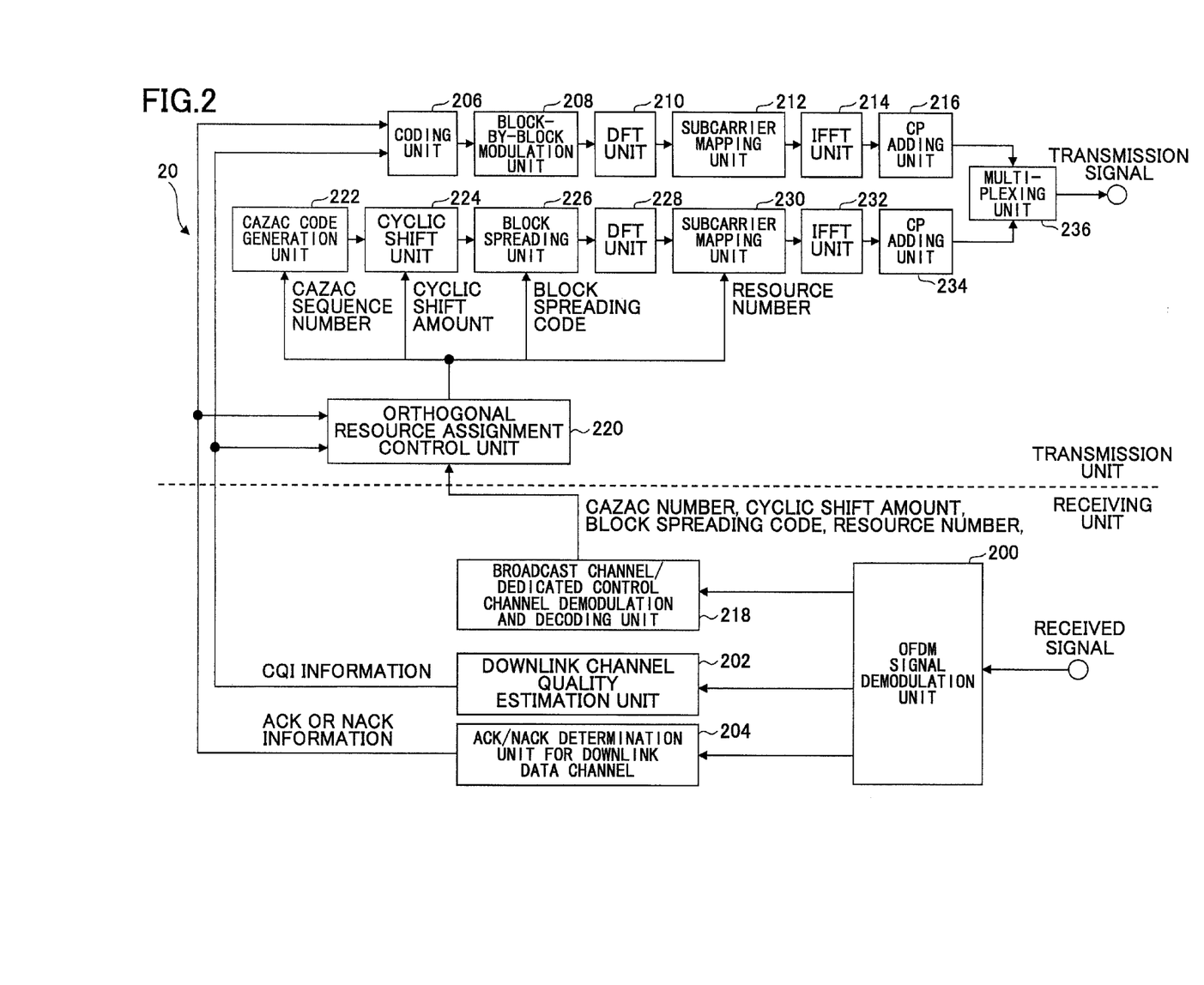
FIG. 2 is a block diagram showing a configuration of user equipment according to an embodiment of the present invention.

FIG. 2 is a block diagram of a mobile station according to an embodiment of the present invention. As shown in the figures, the mobile station 20 includes a receiving unit and a transmission unit. The transmission unit includes an OFDM (Orthogonal Frequency Division Multiplexing) signal demodulation unit 200, a CQI estimation unit 202, an ACK/NACK determination unit 204, a broadcast channel/dedicated control channel demodulation and decoding unit 218. The receiving unit includes a coding unit 206, a block-by-block modulation unit 208, a discrete Fourier transform (DFT) unit 210, a subcarrier mapping unit 212, an inverse fast Fourier transform (DFT) unit 214, a cyclic prefix (CP) adding unit 216, an orthogonal resource assignment control unit 220, a CAZAC code generation unit 222, a cyclic shift unit 224, a block spreading unit 226, and a multiplexing unit 236.

The OFDM signal demodulation unit 200 receives a signal (received signal in FIG. 2) transmitted from the base station, and demultiplexes the received signal into signal components such as a pilot channel, a broadcast channel, a control channel and the like, and demodulates them. In addition, the OFDM signal demodulation unit 200 outputs the demodulated signal to the CQI estimation unit 202, the ACK/NACK determination unit 204, and the demodulation and decoding unit 218.

The CQI estimation unit 202 measures downlink channel state using the signal based on the pilot channel and the like received from the OFDM signal demodulation unit 200, and outputs the result as channel state information (Channel Quality Indicator: CQI). CQI can be derived by converting a measurement value into a predetermined number value, wherein the measured value is obtained by measuring a reception quality of the pilot channel transmitted from the base station, that is, for example, Signal to Interference Ratio (SIR), Signal to Interference Noise Ratio (SINR) or the like.

The ACK/NACK determination unit 204 determines whether there is an error in each packet that forms the received downlink data channel based on the signal received from the OFDM signal demodulation unit 200, and outputs the determination result as acknowledgement information. As the acknowledgement information, there are a positive acknowledgement signal (ACK) indicating there is no error and a negative acknowledgement signal (NACK) indicating there is an error.

CQI and acknowledgement information are input to the coding unit 206 from the ACK/NACK determination unit 204. The coding unit 206 properly performs channel coding according to a case when both of CQI and acknowledgement information are fed back or a case when only CQI is fed back. Then, the coding unit 206 outputs the coded signal to the block-by-block modulation unit 208.

The modulation unit 208 performs predetermined modulation processing on the signal received from the coding unit 206, and generates a sequence of information (only CQI or both of CQI and acknowledgement information) to be fed back to the base station for each block. The block is an information unit forming a slot as described later. Seven blocks form a slot. Also, five blocks of seven blocks are associated with feedback information.

The DFT unit 210 performs discrete Fourier transform on the signal received from the modulation unit 208 to transform the signal of the time domain into a signal of a frequency domain, and outputs the signal obtained by the transform to the subcarrier mapping unit 212.

The subcarrier mapping unit 212 performs mapping in the frequency domain, and outputs the result to the IFFT unit 214.

The IFFT unit 214 performs inverse Fourier transform on the result that is obtained from the subcarrier mapping unit 212 so as to re-transform the signal of the frequency domain to a signal of the time domain. The IFFT unit 214 outputs the signal of the time domain obtained by re-transform to the CP adding unit 216.

The CP adding unit 216 adds a cyclic prefix (CP) to the signal received from the IFFT unit 214. The CP functions as a guard interval for ensuring tolerance against multipath propagation delay, and difference of receiving timing among a plurality of users in the base station. In addition, the CP adding unit 216 outputs the signal to which CP has been added to the multiplexing unit 236.

Based on the signal received from the OFDM signal demodulation unit 200, the broadcast channel/dedicated control channel demodulation and decoding unit 218 specifies code information that includes information on a CASAC code sequence (CAZAC sequence number) used in the mobile station, cyclic shift amount of the CAZAC code sequence, block spreading code and a resource number. The broadcast channel/dedicated control channel demodulation and decoding unit 218 outputs the code information to the orthogonal resource assignment control unit 220.

The orthogonal resource assignment control unit 220 outputs the CAZAC sequence number in the code information obtained from the broadcast channel/dedicated control channel demodulation and decoding unit 218 to the CAZAC code generation unit 222, and outputs the cyclic shift number to the cyclic shift unit 224. In addition, the orthogonal resource assignment control unit 220 outputs the block spreading code in the code information obtained from the broadcast channel/dedicated control channel demodulation and decoding unit 218 to the block spreading code unit 226. Further, the orthogonal resource assignment control unit 220 outputs the resource number (described later) in the code information obtained from the broadcast channel/dedicated control channel demodulation and decoding unit 218 to the subcarrier mapping unit 230.

By receiving the CAZAC sequence number from the orthogonal resource assignment control unit 220, the CAZAC code generation unit 222 generates a CAZAC code according to the number, and outputs the generated CAZAC code to the cyclic shift unit 224.

The cyclic shift unit 224 cyclically shifts each symbol (12 symbols or factors) received from the CAZAC code generation unit 222 based on the cyclic shift number received from the orthogonal resource assignment control unit 220, so as to generate another CAZAC code. One CAZAC code and another CAZAC code obtained by shifting the CAZAC code are orthogonal with each other. Details for the CAZAC code are described in D. C. Chu, "Polyphase codes with good periodic correlation properties", IEEE Trans. Inform. Theory, vol. IT-18, pp. 531-532, July 1972; 3GPP, R1-050822, Texas Instruments, "On allocation of uplink sub-channels in EUTRA SC-FDMA", for example. The cyclic shift unit 224 outputs the other CAZAC code obtained by the cyclic shift to the block spreading unit 226.

By the way, there may be a case in which the cyclic shift unit 224 does not perform the cyclic shift depending on the obtained cyclic shift number (0, for example). In this case, the same CAZAC code as the CAZAC code received from the CAZAC code generation unit 222 is output to the block spreading unit 226.

The block spreading unit 226 performs block spreading processing on the CAZAC code received from the cyclic shift unit 224 according to the block spreading number received from the orthogonal resource assignment control unit 220. The block spreading number may be typically +1 and −1, for example. When the block spreading number is +1, spreading processing may be multiplying the CAZAC code (each symbol of the CAZAC code) by +1, and when the block spreading number is −1, the spreading processing may be multiplying the CAZAC code by −1. The signal obtained by the block spreading processing is output to the DFT unit 228 from the block spreading unit 226.

Like the cyclic shift unit 224 in which there is a case where cyclic shift is not performed depending on the cyclic shift number, there is a case in which the block spreading unit 226 does not perform block spreading processing depending on the obtained block spreading number. In this case, the block spreading unit 226 outputs the received CAZAC code to the DFT unit 228 as it is. That is, the base station properly selects the cyclic shift number and the block spreading number and sends them to the mobile station, so that the mobile station performs one of or both of the cyclic shift and block spreading for the CAZAC code.

The DFT unit 228 performs discrete Fourier transform on the signal received from the block spreading unit 226 to transform the signal of the time domain to a signal of the frequency domain, and outputs the signal obtained by the transform to the subcarrier mapping unit 230.

The subcarrier mapping unit 230 maps the signal received from the DFT unit 228 in the time domain based on the resource number received from the orthogonal resource assignment control unit 220. As described later, the resource number is information for specifying frequency and time used for transmission. The resource number specifies frequency and time in which only CQI is transmitted, and specifies frequency and time in which CQI and ACK/NACK information (that is, combination of CQI and ACK or combination of CQI and NACK) are transmitted. The subcarrier mapping unit 230 outputs the result of the mapping to the IFFT unit 232.

The IFFT unit 232 performs inverse Fourier transform on the mapping result obtained from the subcarrier mapping unit 230 so as to re-transform the signal of the frequency domain to the signal of the time domain. The IFFT unit 214 outputs the signal of the time domain obtained by the re-transform to the CP adding unit 232.

The CP adding unit 234 adds CP to the signal received from the IFFT unit 232, and outputs the signal to which CP has been added to the multiplexing unit 236.

The multiplexing unit 236 receives the corresponding signals from the CP adding units 216 and 234, multiplexes the received signals so as to generate a signal to be transmitted. The signal is output to an RF transmission circuit (not shown in the figure), and transmitted to the base station via a power amplifier and a duplexer (not shown in the figure).

<Base Station>

Figure 3:
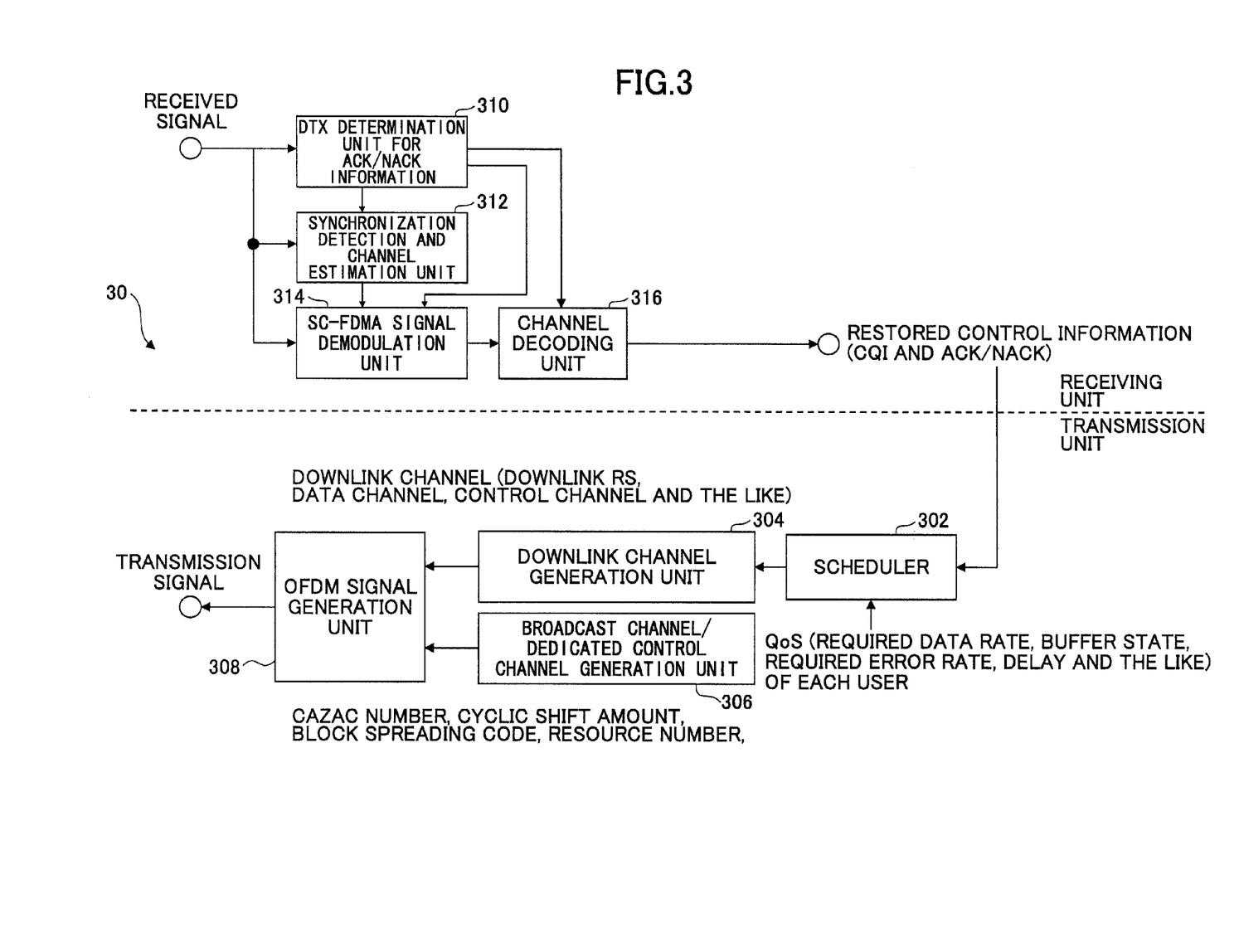
FIG. 3 is a block diagram showing a configuration of a base station according to an embodiment of the present invention.

FIG. 3 is a block diagram of the base station according to an embodiment of the present invention. As shown in the figure, the base station 30 includes a transmission unit and a receiving unit. The transmission unit includes a scheduler 302, a downlink channel generation unit 304, a broadcast channel/dedicated control channel generation unit 306, and an OFDM signal generation unit 308. The receiving unit includes a DTX determination unit 310 for the ACK/NACK information, a synchronization detection and channel estimation unit 312, a SC-FDMA signal demodulation unit 314, and a channel decoding unit 316.

The scheduler 302 determines resource assignment in the downlink based on service quality (QoS: Quality of Service) of each mobile station, wherein the service quality is required data rate, buffer state, required error rate, delay or the like. In addition, the scheduler 302 outputs the determined information to the downlink channel generation unit 304 as scheduling information. The scheduling information includes frequency, time and transmission format that are used for signal transmission.

The downlink channel generation unit 304 generates a downlink channel based on scheduling information received from the scheduler 302, and outputs a generated downlink channel to the OFDM signal generation unit 308.

The broadcast channel/dedicated control channel generation unit 306 determines CAZAC sequence number, cyclic shift number, block spreading code, and resource number to be used by the mobile station, and outputs these pieces of information to the OFDM signal generation unit 308.

The OFDM signal generation unit 308 multiplexes the downlink channel received from the downlink channel generation unit 304 and information received from the broadcast channel/dedicated control channel generation unit 306 to generate a signal to be transmitted, and transmits the signal to the mobile station.

After the mobile station that received the signal transmits information as feedback, the DTX determination unit 310 of the ACK/NACK information in the base station 30 receives information (received signal) transmitted from the mobile station, and performs correlation detection twice for the information. How the correlation detection is performed depends on the CAZAC sequence number, the cyclic shift number, the block spreading code, and the resource number reported to the mobile station (details of correlation detection are described later). In addition, the DTX determination unit 310 compares two correlation values obtained by the correlation detection performed twice, and based on the result, determines whether the mobile station has sent only CQI or the mobile station has sent CQI and ACK/NACK information.

When the DTX determination unit 310 determines that ACK/NACK information has been transmitted, the DTX determination unit 310 sends information indicating that ACK/NACK information has been transmitted to the synchronization detection and channel estimation unit 312, the SC-FDMA signal demodulation unit 314, and the channel decoding unit 318.

Based on the uplink pilot channel (or synchronization channel) in the received signal received from the mobile station, the synchronization detection and channel estimation unit 312 specifies reception timing, estimates channel state of the uplink pilot based on the reception state of the uplink pilot channel, and generates information for channel compensation. The synchronization detection and channel estimation unit 312 outputs these pieces of information to the SC-FDMA signal demodulation unit 314.

The SC-FDMA signal demodulation unit 314 demodulates the received SC-FDMA signal based on the information received from the synchronization detection and channel estimation unit 312 and the DTX determination unit 310, and outputs a demodulated signal to the channel decoding unit 316.

The channel decoding unit 316 properly performs channel decoding processing on the demodulated signal based on the information received from the DTX determination unit 310. Accordingly, the channel decoding unit 316 obtains restored control information and output it, that is, the channel decoding unit 316 obtains CQI and outputs it when the mobile station has sent only CQI, and when the mobile station has sent CQI and ACK/NACK information, the channel decoding unit 316 obtains both of them and outputs them.

<DTX Determination Method>

Next, a communication control method of another embodiment of the present invention is described with reference to the following example.

Example 1

Figure 4:
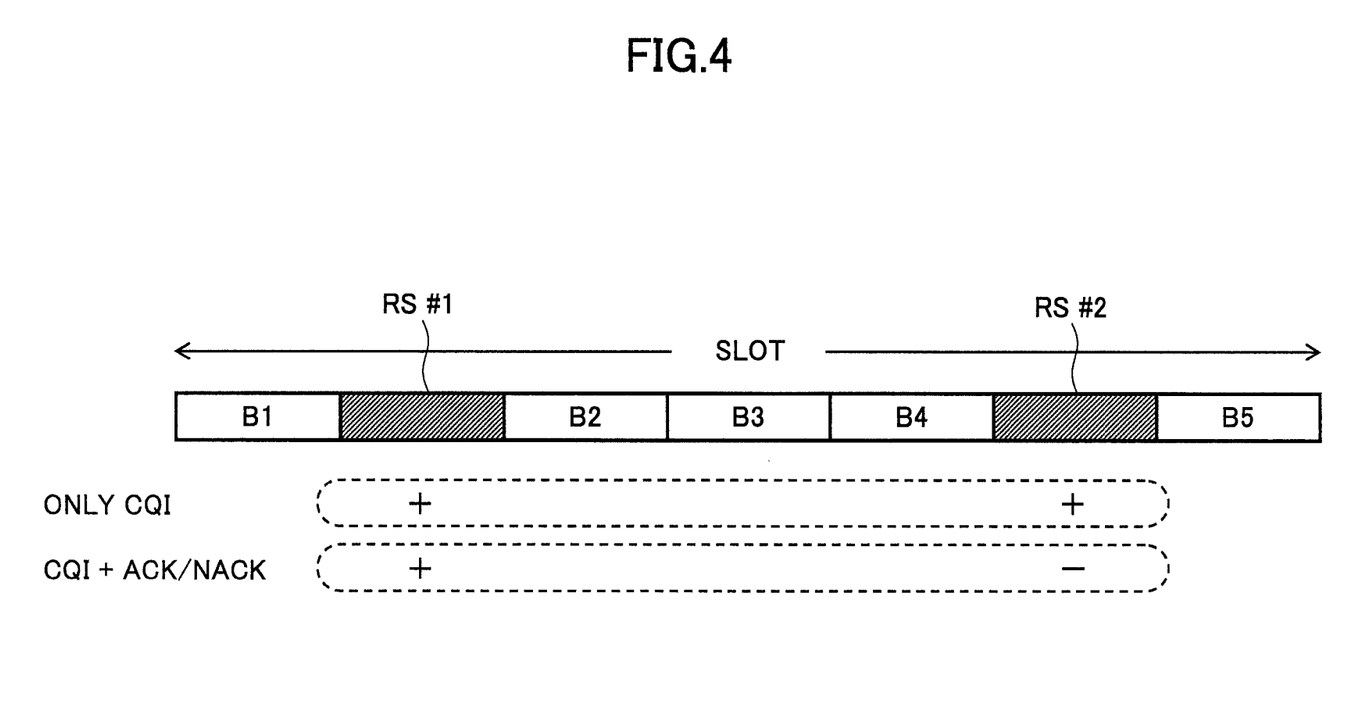
FIG. 4 is a diagram for explaining a configuration of a slot used for determination of ACK/NACK information according to an embodiment of the present invention.
Figure 5:
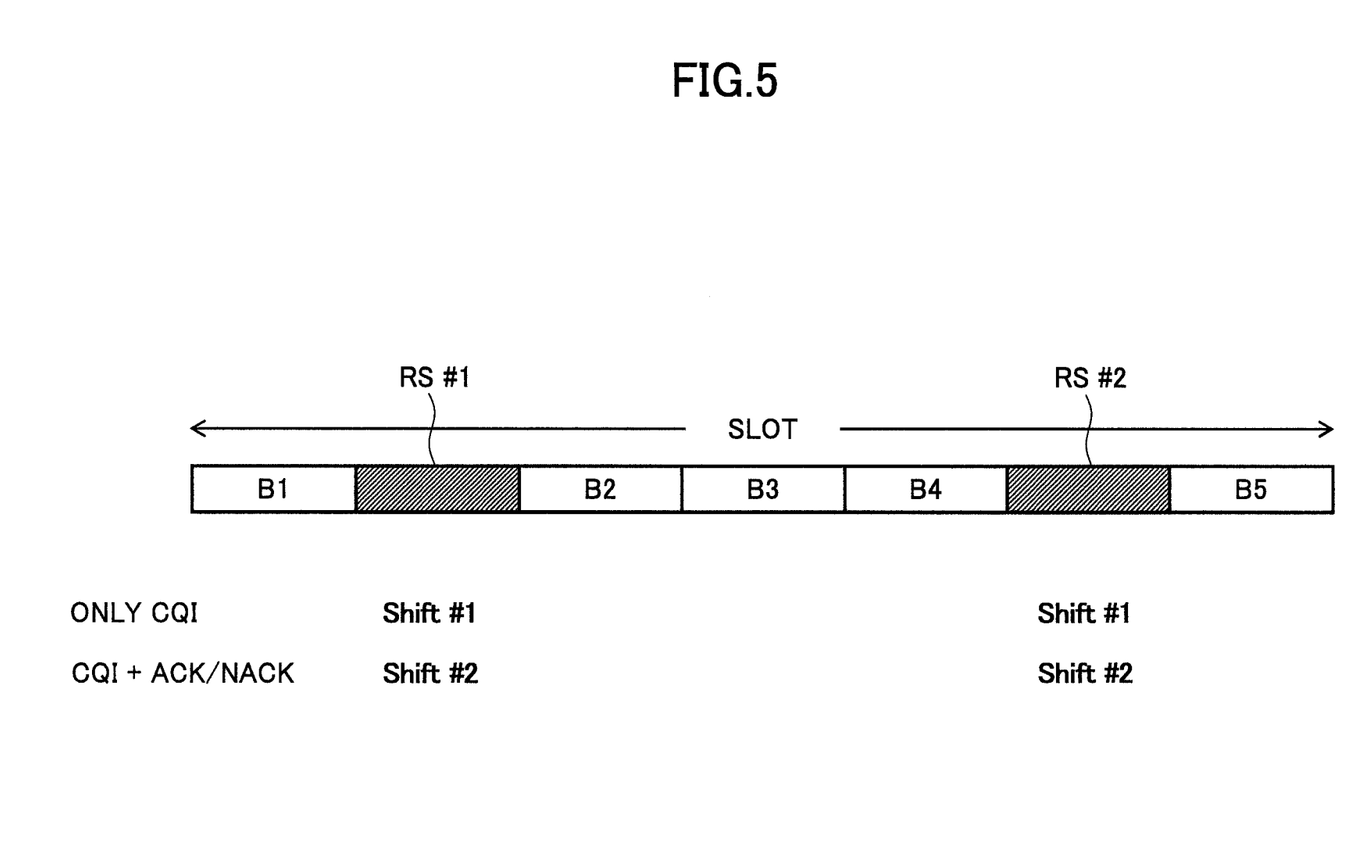
FIG. 5 is a diagram for explaining a configuration of a slot used for determination of ACK/NACK information according to an embodiment of the present invention.

FIG. 4 shows a slot assigned to a user (mobile station). As shown in the figure, the slot includes seven blocks, and two of them are associated with reference signals. In the following, the two reference signal (RS) blocks are referred to as RS#1 and RS#2. RS#1 and RS#2 include symbols of the same sequence. In the example 1, so-called orthogonal covering is used.

One slot corresponds to 0.5 msec, and two slots form one subframe (1 msec) (refer to FIG. 1).

In the example 1, the base station transmits, in addition to a reference signal, information including the CAZAC sequence number and the block spreading number to the mobile station.

The mobile station that receives the reference signal and the like from the base station measures reception state of the propagation route, and generates CQI corresponding to the measurement result. In the case when transmitting only CQI as feedback to the base station, the mobile station stores CQI in blocks B1-B5, generates symbols specified by the CAZAC sequence number reported from the base station. Then, the mobile station multiplies the symbols by +1, and stores the obtained symbols in RS#1 and RS#2 to generate a slot to be transmitted as an uplink control channel. The RS blocks are represented as (+, +) for convenience sake. After that, the mobile station transmits a signal corresponding to the slot to the base station.

The base station that receives the signal from the mobile station performs correlation detection for RS#1 and RS#2. More particularly, the base station, in the DTX determination unit 310, prepares two RS blocks (+, +) that have been obtained by multiplying symbols determined by the CAZAC sequence number by +1, then, the base station performs first correlation detection between these and the received RS#1 and RS#2. Next, the base station prepares an RS block including symbols obtained by multiplying symbols determined by the CAZAC sequence number by +1, and prepares another RS block including other symbols obtained by multiplying the same symbol determined by the CAZAC sequence number by −1 (these RS blocks are represented as (+, −)). Then, the base station performs second correlation detection between these RS blocks and received RS#1 and RS#2.

As mentioned above, since the slot from the mobile station is (+, +), and since first correlation detection is performed between (+, +) and (+, +), a large correlation value is obtained. In the second correlation detection, correlation detection is performed between (+, +) and (+, −), a small correlation value is obtained. Based on the result of comparison between these correlation values, the base station can determine that the mobile station has sent only CQI. After that, the base station can perform processing for the received signal based on the determination without delay. More particularly, the base station performs processing such as demultiplexing, demodulation and decoding for CQI.

On the other hand, in the case when the mobile station feeds CQI and ACK/NACK information back to the base station, the mobile station multiplexes CQI and ACK/NACK information and stores the multiplexed information in B1-B5. Then, the mobile station generates symbols specified by a CAZAC sequence number reported from the base station, multiplies the symbols by +1 to obtain symbols, and stores the obtained symbols in RS#1. Also, the mobile station multiples the symbols specified by the CAZAC sequence number by −1 to obtain symbols, and stores the obtained symbols in RS#2, so that the mobile station generates a slot (+, −) to be transmitted as an uplink channel. Then, the mobile station transmits a signal corresponding to the slot to the base station.

The base station receives the signal from the mobile station, and performs correlation detection for RS#1 and RS#2. More particularly, the base station performs first correlation detection between RS blocks (+, +) in which each symbol is multiplied by +1, and received RS#1 and RS#2. Next, the base station performs second correlation detection between RS blocks (+, −) and the received RS#1 and RS#2, wherein the RS blocks (+, −) include an RS block multiplied by +1 and another RS block multiplied by −1.

As mentioned above, since the slot from the mobile station is (+, −), a small correlation value is obtained in the first correlation detection (correlation detection between (+, −) and (+, +)), and a large correlation value is obtained in the second correlation detection (correlation detection between (+, −) and (+, −)). Based on the results, the base station can determine that the mobile station has transmitted CQI and ACK/NACK information. After that, the base station can perform processing for the received signal based on the determination without delay. More particularly, the base station performs processing such as demultiplexing, demodulation and decoding for each of CQI and ACK/NACK information.

Even in a case when the base station expects to receive CQI and ACK/NACK information transmitted from the mobile station, there is a case in which a large correlation value is obtained in the first correlation detection in the base station, and a small correlation value is obtained in the second correlation detection. In this case, the base station recognizes that the mobile station has transmitted only CQI for some reason even though CQI and ACK/NACK information should be fed back from the mobile station. In other words, the base station recognizes that an error occurs in communication of information between the base station and the mobile station. Based on this recognition, the base station can request the mobile station to retransmit ACK or NACK. Therefore, it can be avoided to start processing of a response signal based on determination that CQI and ACK/NACK information has been received even though ACK or NACK has not been returned from the mobile station. In addition, the base station can transmit a control channel with high transmission power when requesting retransmission. As a result, it becomes possible to improve probability for obtaining CQI and ACK/NACK information in retransmission.

Example 2

In the example 1, orthogonal covering for the reference signal is used. On the other hand, in the example 2, it is determined whether only CQI is transmitted or CQI and ACK/NACK information are transmitted by using cyclic shift of the reference signal.

In the example 2, the base station transmits, to the mobile station, information including a CAZAC sequence number and a cyclic shift number in addition to the reference signal.

When the mobile station transmits only CQI to the base station as feedback, the same cyclic shift is performed for RS#1 and RS#2, for example. In this case, both cyclic shift numbers are the same, which is Shift#1 in this example. That is, the mobile station generates symbols specified by the CAZAC sequence number, performs cyclic shift represented by Shift#1 on the symbols to obtain shifted symbols, and stores the obtained symbols in RS#1 and RS#2. The RS blocks are represented as (Shift#1, Shift#1) for convenience sake. A signal corresponding to the slot generated in this way is transmitted from the mobile station to the base station.

The base station that receives the signal from the mobile station performs correlation detection on RS#1 and RS#2. More particularly, the base station generates symbols specified by the CAZAC sequence number, performs cyclic shift represented by Shift#1 on the symbols to generate shifted symbols, and stores the generated symbols in two RS blocks (Shift#1, Shift#1). The base station performs first correlation detection between the two RS blocks (Shift#1, Shift#1), and RS#1 and RS#2 received from the mobile station. Next, the base station performs second correlation detection between two RS blocks (Shift#2, Shift#2), and the received RS#1 and RS#2, in which the two RS blocks (Shift#2, Shift#2) stores symbols generated by performing cyclic shift represented by Shift#2 different from Shift#1 on the symbols specified by the CAZAC sequence number.

As mentioned above, since the slot from the mobile station is (Shift#1, Shift#1), and since first correlation detection is performed between (Shift#1, Shift#1) and (Shift#1, Shift#1), a large correlation value is obtained. On the other hand, in the second correlation detection, since correlation detection is performed between (Shift#1, Shift#1) and (Shift#2, Shift#2), a small correlation value is obtained due to orthogonality derived from the cyclic shift of the CAZAC code. Based on the results, the base station can determine that the mobile station has sent a slot of (Shift#1, Shift#1). That is, the base station can determine that the mobile station has sent only CQI. After that, the base station can perform processing for the received signal based on the determination.

On the other hand, in the case when the mobile station transmits CQI and ACK/NACK information to the base station as feedback, the mobile station generates a slot of (Shift#2, Shift#2), and transmits a signal corresponding to the slot to the base station.

When the base station receives the signal from the mobile station, in the same way as mentioned above, the base station performs correlation detection between (Shift#1, Shift#1) and the received slot as first correlation detection. Next, the base station performs correlation detection between (Shift#2, Shift#2) and the received slot as second correlation detection.

Since the slot from the mobile station is (Shift#2, Shift#2), a small correlation value is obtained in the first correlation detection between (Shift#1, Shift#1) and (Shift#2, Shift#2). Since the second correlation detection is performed between (Shift#1, Shift#1) and (Shift#1, Shift#1), a large correlation value is obtained. Based on the results, the base station can determine that the mobile station has transmitted CQI and ACK/NACK information. After that, the base station can perform processing for the received signal based on the determination without delay.

Also in the example 2, even in a case when the base station expects to receive CQI and ACK/NACK information transmitted from the mobile station, there is a case in which a large correlation value is obtained in the first correlation detection, and a small correlation value is obtained in the second correlation detection. Like the above mentioned example 1, even in such as case, the base station can recognize that the mobile station has transmitted only CQI erroneously. Based on this recognition, the base station can request the mobile station to perform retransmission. In this case, the base station can transmit a control channel with high transmission power.

In the DTX determination method in the examples 1 and 2, correlation detection is performed twice by using symbols that are orthogonal with each other. Thus, the method has an advantage that difference between the two correlation values obtained as the result becomes large. Therefore, accuracy for determination improves compared to a method for determining whether the mobile station has transmitted only CQI or both of CQI and ACK/NACK information by comparing received power and a predetermined threshold.

Example 3

In the example 3, the whole of the slot is used instead of the reference signal blocks in the slot. More particularly, difference between radio resource blocks is used.

Figure 6:
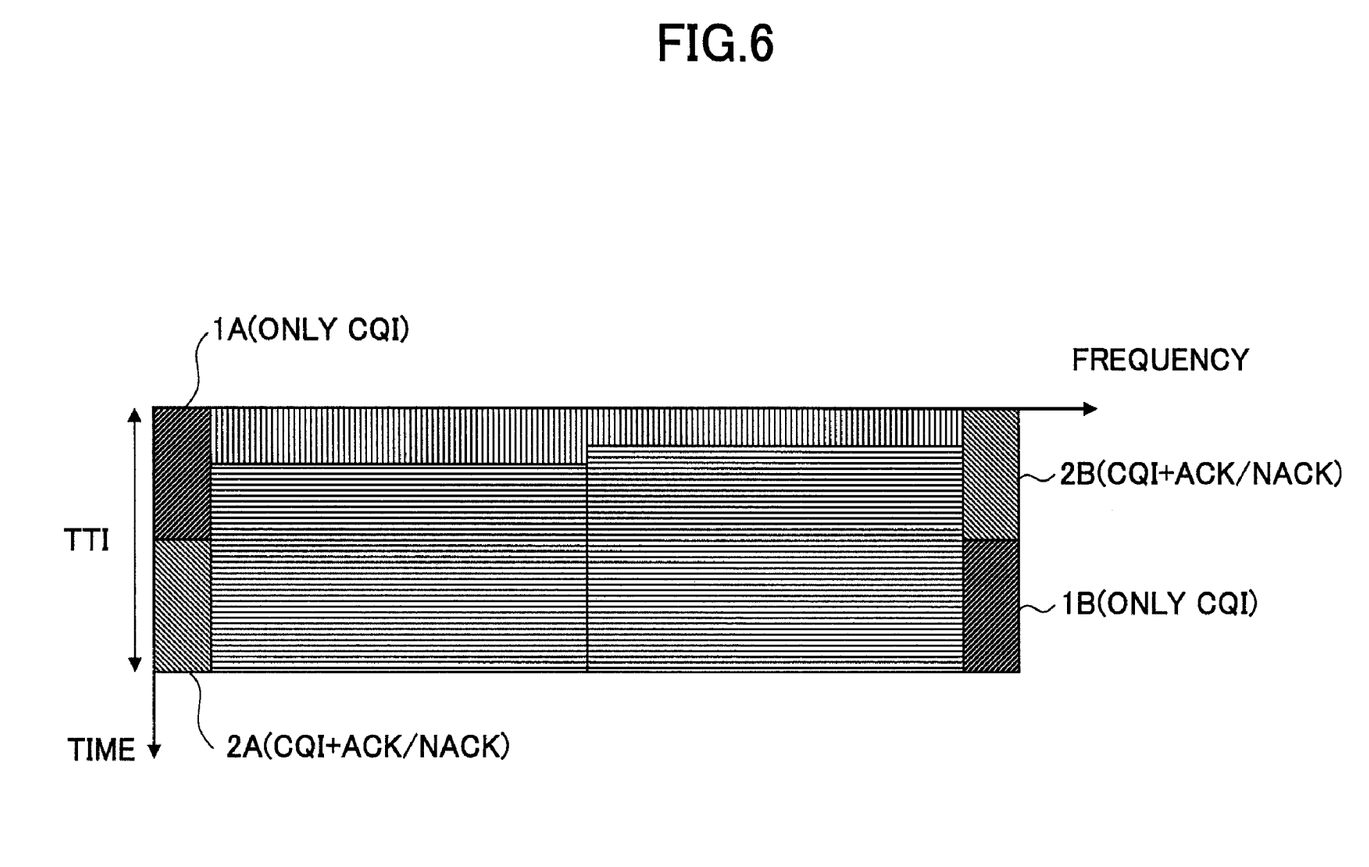
FIG. 6 is a diagram for explaining a configuration of a slot used for determination of ACK/NACK information according to an embodiment of the present invention.

FIG. 6 is a diagram showing resource assignment in cases where the mobile station transmits only CQI and transmits CQI and ACK/NACK information. As shown in the figure, when the mobile station transmits only CQI, the mobile station uses slots 1A and 1B, for example, according to resource numbers reported from the base station without using slots 2A and 2B. Slots 1A and 1B (2A, 2B) form a subframe (Transmission Time Interval (TTI)).

When a signal corresponding to the slots is transmitted from the mobile station, the base station that receives the signal performs correlation detection, as first correlation detection, using the slots 1A and 1B, and performs correlation detection, as second correlation detection, using slots 2A and 2B.

Since the mobile station transmits CQI using the slots 1A and 1B, a large correlation value can be obtained as a result of the first correlation detection. On the other hand, since the mobile station does not use slots 2A and 2B, there is no information for these slots. Thus, a small correlation value is obtained as a result of the second correlation detection. Therefore, by comparing the correlation values, the base station can determine that the mobile station has transmitted only CQI, and can perform reception processing after that without delay.

On the other hand, in contrast to the case in which the mobile station transmits only CQI, when the mobile station transmits CQI and ACK/NACK information, slots 1A and 1B are not used, but slots 2A and 2B are used.

When a signal corresponding to the slots is transmitted from the mobile station, the base station that receives the signal performs correlation detection, as first correlation detection, using slots 1A and 1B, and performs correlation detection using slots 2A and 2B as second correlation detection, in the same way as mentioned above.

In this case, a small correlation value is obtained by the first correlation detection, and a large correlation value is obtained by the second correlation detection. Therefore, by comparing the correlation values, the base station can determine that the mobile station has transmitted CQI and ACK/NACK information, and can perform reception processing after that without delay.

Also in example 3, in a case where the base station expects to receive CQI and ACK/NACK information transmitted from the mobile station (that is, expects that the correlation value becomes large based on the slots 2A and 2B), even though the correlation value of slots 1A and 1B becomes large as a result of comparison of the correlation values, the base station can recognize that an error occurs.

Also in example 3, the base station determines whether the mobile station has transmitted only CQI or transmitted CQI and ACK/NACK information by comparing correlation values obtained by correlation detection performed twice. Thus, accuracy for determination improves compared to a method for determining whether the mobile station has transmitted only CQI or both of CQI and ACK/NACK information by comparing received power and a predetermined threshold.

As mentioned above, although the communication control method, the mobile station and the base station relating to the present invention have been described with reference to some embodiments and examples, the present invention is not limited to the above embodiments, and various modifications and alternatives can be made.

For example, in example 1, although slot (+, −) is generated when transmitting only CQI and slot (+, −) is generated when transmitting CQI and ACK/NACK information, the reverse can be applied. In addition, unless orthogonality of CAZAC code is lost, the value used for multiplying can be determined arbitrarily.

In example 2, it is apparent that the amount (number of times) for the cyclic shift may be determined as appropriate. In addition, although CAZAC code is used in examples 1 and 2, the code is not limited to that, and, even though other symbol is used, it is possible to perform determination by comparing correlation values obtained by correlation detection performed twice.

The present international application claims priority based on Japanese patent application No. 2007-211600, filed in the JPO on Aug. 14, 2007, and the entire contents of the Japanese patent application No. 2007-211600 are incorporated herein by reference.

The invention claimed is:

1. A communication control method for determining whether information transmitted from a mobile station in a single-carrier scheme includes reception state information and acknowledgement information, comprising:

a step in which the mobile station generates a first uplink control channel when transmitting reception state information, and the mobile station generates a second uplink control channel when transmitting reception state information and acknowledgement information;

a step in which the mobile station transmits one of the first uplink control channel and the second uplink control channel;

a step in which the base station receives one of the first and the second uplink control channels, performs first correlation detection for the received uplink control channel to obtain a first correlation value, and performs second correlation detection for the received uplink control channel to obtain a second correlation value; and a step in which the base station compares the first correlation value and the second correlation value, and determines that the mobile station has transmitted the reception state information if the first correlation value is greater than the second correlation value, and the base station determines that the mobile station has transmitted the reception state information and the acknowledgement information if the second correlation value is greater than the first correlation value.

2. The communication control method as claimed in claim 1, wherein the first uplink control channel includes first symbols, and
the second uplink control channel includes second symbols.

3. The communication control method as claimed in claim 2, wherein the first symbols and the second symbols have orthogonality.

4. The communication control method as claimed in claim 2, wherein the first symbols are obtained by multiplying both of symbols of two reference signal blocks by +1,
the second symbols are obtained by multiplying one of symbols of two reference signal blocks by +1 and by multiplying other symbols by −1,
the correlation detection performed first uses the first symbols, and
the correlation detection performed second uses the second symbols.

5. The communication control method as claimed in claim 2, wherein the first symbols are obtained by cyclic shift represented by a first shift number,
the second symbols are obtained by cyclic shift represented by a second shift number,
the correlation detection performed first uses the first symbols, and
the correlation detection performed second uses the second symbols.

6. The communication control method as claimed in claim 1, wherein first information indicating that reception state information is transmitted in the first uplink control channel is associated with a first frequency block,
second information indicating that reception state information is transmitted in the second uplink control channel is associated with a second frequency block,
the first correlation detection uses the first frequency block, and
the second correlation detection uses the second frequency block.

7. A mobile station comprising:
an uplink control channel generation unit configured to generate a first uplink control channel when transmitting reception state information, and to generate a second uplink control channel when transmitting reception state information and acknowledgement information,
wherein a base station receives one of the first and the second uplink control channels, performs first correlation detection for the received uplink control channel to obtain a first correlation value, and performs second correlation detection for the received uplink control channel to obtain a second correlation value,
wherein the base station compares the first correlation value and the second correlation value, and determines that the mobile station has transmitted the reception state information if the first correlation value is greater than the second correlation value, and
wherein the base station determines that the mobile station has transmitted the reception state information and the acknowledgement information if the second correlation value is greater than the first correlation value.

8. The mobile station as claimed in claim 7, wherein the first uplink control channel includes first symbols, and
the second uplink control channel includes second symbols.

9. The mobile station as claimed in claim 8, wherein the first symbols and the second symbols have orthogonality.

10. The mobile station as claimed in claim 8, wherein the first symbols are obtained by multiplying both of symbols of two reference signal blocks by +1,
the second symbol is obtained by multiplying one of symbols of the two reference signal blocks by +1 and by multiplying other symbols by −1,
the first correlation detection uses the first symbols, and
the second correlation detection uses the second symbols.

11. The mobile station as claimed in claim 8, wherein the first symbols are obtained by cyclic shift represented by a first shift number,
the second symbols are obtained by cyclic shift represented by a second shift number,
the first correlation detection uses the first symbols, and
the second correlation detection uses the second symbols.

12. The mobile station as claimed in claim 7,
wherein first information indicating that reception state information is transmitted in the first uplink control channel is associated with a first frequency block,
wherein second information indicating that reception state information is transmitted in the second uplink control channel is associated with a second frequency block,
wherein the first correlation detection uses the first frequency block, and
wherein the second correlation detection uses the second frequency block.

13. A base station used with a mobile station, the mobile station comprising:
an uplink control channel generation unit configured to generate a first uplink control channel when transmitting reception state information, and to generate a second uplink control channel when transmitting reception state information and acknowledgement information,
the base station comprising:
a determination unit configured to receive one of the first and the second uplink control channels from the mobile station, perform first correlation detection for the received uplink control channel to obtain a first correlation value, and perform second correlation detection for the received uplink control channel to obtain a second correlation value, and
to compare the first correlation value and the second correlation value, and determine that the mobile station has transmitted the reception state information if the first correlation value is greater than the second correlation value, and determine that the mobile station has transmitted the reception state information and the acknowledgement information if the second correlation value is greater than the first correlation value.

14. The base station as claimed in claim 13, wherein the first uplink control channel includes first symbols, and
the second uplink control channel includes second symbols.

15. The base station as claimed in claim 14, wherein the first symbols and the second symbols have orthogonality.

16. The base station as claimed in claim 14, wherein the first symbols are obtained by multiplying both of symbols of two reference signal blocks by +1,
the second symbols are obtained by multiplying one of symbols of the two reference signal blocks by +1 and by multiplying other symbols by −1,
the first correlation detection uses the first symbols, and
the second correlation detection uses the second symbols.

17. The base station as claimed in claim 14, wherein the first symbols are obtained by cyclic shift represented by a first shift number,
the second symbols are obtained by cyclic shift represented by a second shift number,
the first correlation detection uses the first symbols, and
the second correlation detection uses the second symbols.

18. The base station as claimed in claim 13, wherein first information indicating that reception state information is transmitted in the first uplink control channel is associated with a first frequency block,
second information indicating that reception state information is transmitted in the second uplink control channel is associated with a second frequency block,
the first correlation detection uses the first frequency block, and
the second correlation detection uses the second frequency block.

* * * * *